(12) United States Patent
Takemoto

(10) Patent No.: US 10,429,009 B2
(45) Date of Patent: Oct. 1, 2019

(54) HIGH PRESSURE GAS CONTAINER AND METHOD FOR MANUFACTURING HIGH PRESSURE GAS CONTAINER

(71) Applicant: NISSAN MOTOR CO., LTD., Yokohama-shi, Kanagawa (JP)

(72) Inventor: Shinichirou Takemoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/558,868

(22) PCT Filed: Mar. 17, 2015

(86) PCT No.: PCT/JP2015/057906
§ 371 (c)(1),
(2) Date: Sep. 15, 2017

(87) PCT Pub. No.: WO2016/147317
PCT Pub. Date: Sep. 22, 2016

(65) Prior Publication Data
US 2018/0073683 A1 Mar. 15, 2018

(51) Int. Cl.
*F17C 13/04* (2006.01)
*B29C 49/20* (2006.01)
(Continued)

(52) U.S. Cl.
CPC .......... *F17C 13/04* (2013.01); *B29C 49/20* (2013.01); *F17C 1/00* (2013.01); *F17C 1/16* (2013.01); *B29K 2023/00* (2013.01); *B29K 2995/0067* (2013.01); *B29L 2031/712* (2013.01); *F17C 2201/0109* (2013.01); *F17C 2201/056* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2205/0317* (2013.01); *F17C 2205/0323* (2013.01); *F17C 2221/012* (2013.01); *F17C 2223/036* (2013.01); *F17C 2225/0123* (2013.01); *F17C 2225/036* (2013.01); *F17C 2227/0302* (2013.01); *F17C 2250/0439* (2013.01);
(Continued)

(58) Field of Classification Search
CPC ........ F17C 2205/0317; F17C 2260/023; F17C 2260/021; F17C 2260/04; F17C 2250/0439; F17C 2205/0338; F17C 13/04; F17C 2205/0332
USPC ....................................................... 220/581
See application file for complete search history.

(56) References Cited

U.S. PATENT DOCUMENTS 5,758,796 A 6/1998 Nishimura et al.
2009/0308874 A1 12/2009 Lindner et al.
(Continued)

FOREIGN PATENT DOCUMENTS

DE 10 2006 052 382 A1 5/2008
JP 9-96399 A1 4/1997
(Continued)

*Primary Examiner* — Stephen J Castellano
(74) *Attorney, Agent, or Firm* — Foley & Lardner LLP

(57) ABSTRACT

In a high pressure gas container with a container body having a fusible plug valve and a boss portion arranged at a position different from the fusible plug valve, each of the fusible plug valve and the boss portion has a higher heat conductivity than the container body, the fusible plug valve and the boss portion are connected by a heat conductor and the heat conductor is accommodated in the container body.

4 Claims, 5 Drawing Sheets

(51) Int. Cl.
  *F17C 1/00* (2006.01)
  *F17C 1/16* (2006.01)
  *B29K 23/00* (2006.01)
  *B29L 31/00* (2006.01)

(52) U.S. Cl.
  CPC .............. *F17C 2250/0491* (2013.01); *F17C 2260/021* (2013.01); *F17C 2260/023* (2013.01); *F17C 2260/04* (2013.01); *F17C 2270/0168* (2013.01); *Y02E 60/321* (2013.01)

(56) References Cited

U.S. PATENT DOCUMENTS

| | | |
|---|---|---|
| 2011/0180551 A1 | 7/2011 | Handa |
| 2011/0226782 A1 | 9/2011 | Mueller et al. |

FOREIGN PATENT DOCUMENTS

| | | |
|---|---|---|
| JP | 2002-181295 A | 6/2002 |
| JP | 2005-315294 A | 11/2005 |
| JP | 2006-316934 A | 11/2006 |
| JP | 2007-333175 A | 12/2007 |
| JP | 2011-149545 A | 8/2011 |
| JP | 2012-189106 A | 10/2012 |

HIGH PRESSURE GAS CONTAINER AND METHOD FOR MANUFACTURING HIGH PRESSURE GAS CONTAINER

This application is the national stage (Rule 371) of international application No. PCT/JP2015/057906 filed Mar. 17, 2015.

TECHNICAL FIELD

The present invention relates to a high pressure gas container with a fusible plug valve and a method for manufacturing a high pressure gas container.

BACKGROUND ART

There is known a technique for attaching a fusible plug valve to a high pressure gas container to reduce a pressure in the container when the container is exposed to a high temperature environment. The fusible plug valve is a valve composed of a housing integrated with a boss portion of the container serving as an in-out flow port of high pressure gas and including a flow passage penetrating from the inside to the outside of the container, and a substantially cylindrical fusible plug for closing the flow passage. The fusible plug is made of a metal having a low melting point and melts by being exposed to a high temperature. This causes the high pressure gas in the high pressure gas container to be released to outside through the flow passage even if the container is exposed to a high temperature environment, whereby it can be suppressed that the pressure in the container becomes a high pressure beyond a normal use range.

Metallic materials and carbon fiber reinforced plastics are used as a material of a body of the high pressure gas container. Nowadays, carbon fiber reinforced plastic materials are widely used as reinforcing materials in terms of strength and weight saving. On the other hand, in the case of using a material having a low thermal conductivity such as carbon fiber reinforced plastic as the material of the high pressure gas container body, heat hardly transfers in the container body. Thus, if a part of the container is heated at a position distant from the fusible plug valve such as a container end part on an opposite side, it may possibly take time until this heat is transferred to the fusible plug valve. In such a case, the melting of the fusible plug valve as described above does not occur despite a temperature increase in a part of the container, an internal pressure may increase and the durability of the container may be reduced.

Against this problem, a high pressure gas container in which a heat conductor extends from a fusible plug valve provided in the high pressure gas container along a side surface of a container body outside the container to transfer heat to a safety valve is disclosed in JP2005-315294A.

SUMMARY OF INVENTION

In the case of JP2005-315294A, the heat conductor is possibly broken by receiving an impact from another member present outside the container. Particularly, in the case of assuming a high pressure gas container serving as a tank for storing a hydrogen fuel in an automotive vehicle carrying fuel cells (FCs), a multitude of constituent members are possibly arranged around this high pressure gas container. For example, it is also assumed that an unintended impact is given due to the interference of the above heat conductor with other constituent members due to vibration during travel and the like.

To solve such a conventional problem, the present invention aims to provide a high pressure gas container capable of preventing the breakage of a heat conductor while ensuring a heat transfer function of the heat conductor to a fusible plug valve and a method for manufacturing a high pressure gas container.

According to one aspect of the present invention, a high pressure gas container with a container body having a fusible plug valve and a boss portion arranged at a position different from the fusible plug valve is provided. The high pressure gas container includes each of the fusible plug valve and the boss portion has a higher heat conductivity than the container body. Further, the high pressure gas container includes the fusible plug valve and the boss portion are connected by a heat conductor, the heat conductor being accommodated in the container body.

DESCRIPTION OF EMBODIMENTS

Hereinafter, embodiments of the present invention are described with reference to the drawings.

(First Embodiment)

Figure 1:
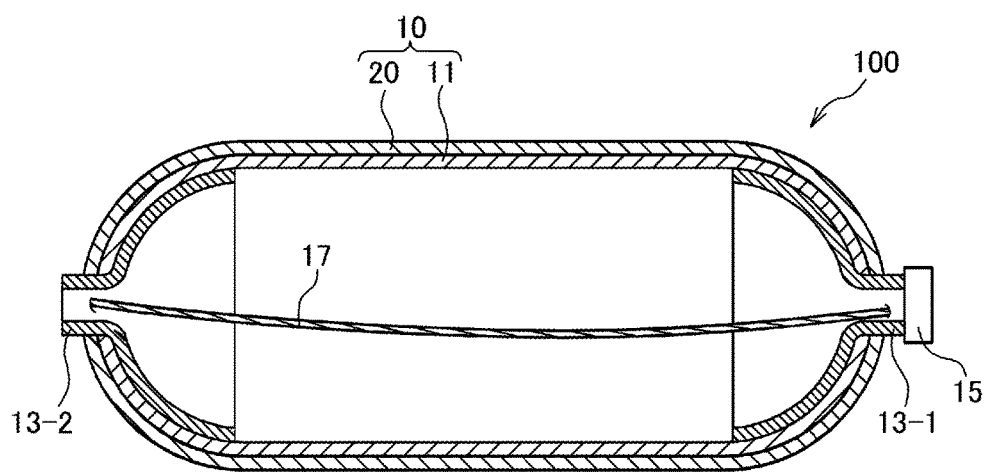
FIG. 1 is a schematic configuration diagram of a high pressure gas container according to a first embodiment of the present invention.

FIG. 1 is a schematic configuration diagram showing a high pressure gas container according to a first embodiment of the present invention.

A high pressure gas container 100 of the present embodiment includes a substantially cylindrical container body 10, boss portions 13-1, 13-2 arranged on both ends in a longitudinal direction of the container body 10, a fusible plug valve 15 disposed at one boss portion 13-1 of the container body 10 and a heat conductor 17 connecting the one boss portion 13-1 and the other boss portion 13-2 inside the high pressure gas container 100.

Gas in a high pressure state of 35 MPa or 70 MPa is stored in the high pressure gas container 100. Various types of gas can be assumed as this gas. In the present embodiment, hydrogen gas is particularly assumed and the high pressure gas container 100 storing this hydrogen gas is installed, for example, in a fuel cell vehicle.

Further, the container body 10 includes an inner layer body 11 formed of a material having gas barrier properties such as polyethylene resin or polypropylene resin in terms of weight saving and a reinforcing layer 20 serving as an outer layer portion and formed of carbon fiber reinforced plastic (CFRP) wound on the outer periphery of this inner layer body 11.

The reinforcing layer 20 is a layered body having a low heat conductivity and formed by winding strip-like carbon fiber reinforced plastic on the outer periphery of the inner layer body 11, for example, utilizing a filament winding method. The shape of the reinforcing layer 20 is determined according to performance required for the high pressure gas container 100.

Materials such as stainless steel and aluminum are used as a material of the boss portions 13-1, 13-2. It should be noted that the material of the boss portions 13-1, 13-2 is not limited to these stainless steel and aluminum and another metallic or nonmetallic material can be used as long as the boss portions 13-1, 13-2 have a higher heat conductivity than the container body 10.

Although not shown in detail, the fusible plug valve 15 is basically composed of a housing with a main flow passage for filling gas penetrating from the inside to the outside of the container body 10 and a discharge flow passage for discharging the high pressure gas inside when the container body 10 is exposed to a high temperature. This housing is provided with a substantially cylindrical fusible plug for closing the above discharge flow passage. The fusible plug is formed of a metal having a low melting point and melts when being exposed to a high temperature. If the fusible plug melts in this way, the inside of the container body 10 communicates with the outside via the aforementioned discharge flow passage penetrating from the inside to the outside of the container body 10. Further, in the present embodiment, the housing of the fusible plug valve 15 is integrated with one boss portion 13-1. Specifically, the housing of the fusible plug valve 15 and the boss portion 13-1 are made of the same material.

In this way, even if the high pressure gas container 100 is exposed to a high temperature environment, the high pressure gas in the high pressure gas container 100 is discharged to the outside and it can be suppressed that the pressure inside the high pressure gas container 100 becomes a high pressure beyond a normal use range. Examples of the metal used for the above fusible valve include lead and tin. It should be noted that materials other than metallic materials may be used as the material of the fusible valve provided that these materials have a lower melting point than the housing. On the other hand, metallic materials having a higher melting point than the fusible plug, particularly having a higher heat conductivity than the container body 10 such as aluminum, stainless steel and copper alloy are used as the material of the housing of the fusible plug valve 15.

Furthermore, the other boss portion 13-2 is provided at another end part of the container body 10, which is at a position different from the aforementioned fusible plug valve 15, and is closed by a lid member or the like.

The heat conductor 17 is a member for connecting the one boss portion 13-1 and the other boss portion 13-2 inside the container 100 and transfers heat from the other boss portion 13-2 to the fusible plug valve 15 via the one boss portion 13-1. Specifically, the heat conductor 17 is indirectly connected to the fusible plug valve 15 via the boss portion 13-1. In the present embodiment, the heat conductor 17 is made of a material having a higher heat conductivity than the container body 10. Specifically, the heat conductor 17 is made of a metallic material such as stainless steel or aluminum. Particularly, in the case of the high pressure gas container 100 of the present embodiment for storing the hydrogen gas, the heat conductor 17 is desirably formed of material resistant to hydrogen embrittlement including stainless steel such as SUS316L (JIS standard) and aluminum such as A6061 (JIS standard) since the heat conductor 17 is constantly exposed to the hydrogen gas in the high pressure gas container 100.

Particularly, the heat conductor 17 of the present embodiment is formed of a braided wire made of aluminum. The braided wire is formed by braiding a plurality of wires and the bundled wires have, for example, a diameter of about 12 mm on the whole. Although not shown here, a doughnut-shaped metal terminal with a hole for attachment to the boss portions 13-1, 13-2 on both ends of the container body 10 is provided on each of both ends of the heat conductor 17. In the present embodiment, the boss portion13-1, 13-2 is also formed with a bolt hole for the attachment of the heat conductor 17, and the heat conductor 17 is fixed to the boss portion 13-1, 13-2 by the above doughnut-shaped metal terminal being fastened to a bolt. It should be noted that an attachment mode of the boss portions 13-1, 13-2 and the heat conductor 17 is not limited to this and these can be connected by various methods such as connector connection, hook connection and welding.

Further, in the present embodiment, the heat conductor 17 is formed such that the entire length thereof is longer than a distance between the boss portions 13-1 and 13-2 on the both ends, i.e. the heat conductor 17 is slackened between the boss portions 13-1 and 13-2 with the heat conductor 17 attached to the boss portions 13-1, 13-2. By giving a length margin so that the heat conductor 17 is slackened between the boss portions 13-1 and 13-2 in this way, deformation due to thermal expansion and contraction can be absorbed. The heat conductor 17 defines a displacement absorbing portion that is configured to remain attached after expansion or contraction of the container body. The displacement absorbing portion can take the form of a braided wire or a bellows portion.

According to the high pressure gas container 100 relating to the present embodiment and including the heat conductor 17 described above, the following effect can be obtained.

The high pressure gas container 100 of the present embodiment includes the fusible plug valve 15 and the container body 10 provided with the boss portion 13-2 arranged at the position different from the fusible plug valve 15. Each of the fusible plug valve 15 and the boss portion 13-2 has a higher heat conductivity than the container body 10. Further, the fusible plug valve 15 and the boss portion 13-2 are connected by the heat conductor 17 and the heat conductor 17 is accommodated in the container body 10.

Here, that "the fusible plug valve 15 and the boss portion 13-2 are connected by the heat conductor 17" means not only that the fusible plug valve 15 and the boss portion 13-2 are directly connected by the heat conductor 17, but also that the fusible plug valve 15 and the boss portion 13-2 are indirectly connected by the heat conductor 17 such as via the boss portion 13-1.

Since the heat conductor 17 connecting the fusible plug valve 15 and the boss portion 13-2 is accommodated in the container body 10 in the high pressure gas container 100 of the present embodiment, the heat conductor 17 is prevented from receiving interference such as collision by other members arranged around the high pressure gas container 100, with the result that the breakage of the heat conductor 17 is prevented.

Further, in the present embodiment, the heat conductor 17 is connected to the one boss portion 13-1 integrated with the fusible plug valve 15 and the other boss portion 13-2. Since the fusible plug valve 15 integrated with the boss portion 13-1 and the boss portion 13-2 have a higher heat conductivity than the inner layer body 11 and the reinforcing layer 20, heat is quickly transferred from a part of the boss portion 13-2 having a high heat conductivity to the fusible plug valve 15 via the heat conductor 17 when an end part of the high pressure gas container 100 opposite to the fusible plug valve 15 (i.e. part of the other boss portion 13-2) reaches a high temperature.

In this way, the fusible plug valve 15 is more reliably melted by properly transferring heat generated near the boss portion 13-2 to the fusible plug valve 15. Specifically, according to the present embodiment, a heat transfer function of the heat conductor 17 is more effectively exhibited as compared to the case where the other end (side different from the fusible plug valve 15) of the heat conductor 17 is an open end without being connected to the boss portion 13-2.

Particularly, in the present embodiment, the heat conductor 17 has a higher heat conductivity than the container body 10. Thus, a function of the heat conductor 17 to promptly transfer heat to the above fusible plug valve 15 can be more reliably exhibited.

Specifically, the container body 10 in the high pressure gas container 100 of the present embodiment is formed by winding the reinforcing layer 20 having a low heat conductivity around the inner layer body 11, which is a resin liner. Thus, as compared to a tank whose container body is entirely made of a metallic material, heat tends to be hardly transferred in the container body 10 even if a part of the high pressure gas container 100 is exposed to a high temperature.

However, in the high pressure gas container 100 of the present embodiment, the boss portions 13-1, 13-2 on the both ends are connected by the heat conductor 17 having a higher heat conductivity than the container body 10. Thus, heat generated in a part of the high pressure gas container 100 can be transferred from the boss portion 13-2 to the fusible plug valve 15 via the heat conductor 17 without depending on heat transfer on the inner layer body 11 or the reinforcing layer 20.

Particularly, the heat conductor 17 of the present embodiment is configured as the braided wire made of aluminum material and having a diameter of 12 mm. In this case, if a thickness of the reinforcing layer 20 made of carbon fiber reinforced plastic is assumed to be 20 mm, a time until the fusible plug valve 15 is melted by heat transferred through the heat conductor 17 from the boss portion 13-2 after the boss portion 13-2 at the position distant from the fusible plug valve 15 reaches a high temperature is shortened to about ⅕ as compared to the case where the heat conductor 17 is not provided, i.e. the heat of the boss portion 13-2 is transferred through the reinforcing layer 20.

Specifically, when the thickness of the reinforcing layer 20 is 20 mm, a heat transfer rate of the heat conductor 17 is about 5 times as fast as that of the reinforcing layer 20 although a cross-sectional area of the reinforcing layer 20 is about 178-fold of that of the heat conductor 17 having a diameter of 12 mm. Since the heat conductor 17 is configured such that the heat transfer rate thereof is faster than that of the reinforcing layer 20 in this way, the time until the fusible plug valve 15 is melted by the heat transferred through the heat conductor 17 from the boss portion 13-2 after the boss portion 13-2 at the position distant from the fusible plug valve 15 reaches a high temperature is shortened as compared to the case where the heat conductor 17 is not provided.

Further, the heat conductor 17 of the present embodiment is assembled while being slackened between the fusible plug valve 15 and the boss portion 13-2. This can suppress the influence of tension and compression by slack even if the inner layer body 11 undergoes thermal deformation such as expansion or contraction due to a temperature difference or the like. Further, since the thermal deformation of the heat conductor 17 itself due to a temperature change in the inner layer body 11 is also absorbed by the above slack, the breakage of the heat conductor 17 is more reliably prevented. Therefore, the heat conductor defines a displacement absorbing portion and the heat conductor is configured to remain attached after expansion or contraction of the container body.

In this case, it is particularly preferable to slacken the heat conductor 17 to a degree not to contact the inner peripheral surface of the inner layer body 11. In this way, even if the high pressure gas container 100 is installed in a vehicle, it is prevented that a sense of incongruity is given to a driver by preventing a situation in which unnecessary noise is generated due to the contact of the heat conductor 17 with the inner layer body 11. Further, if the heat conductor 17 and the inner layer body 11 contact each other, heat supposed to be transferred to the fusible plug valve 15 escapes to the side of the inner layer body 11 via this contact part and the durability of the inner layer body 11 may be reduced by this heat. Such a situation is also prevented by the heat conductor 17 according to the present embodiment.

Further, in the high pressure gas container 100 of the present embodiment, the general braided wire is used as the heat conductor 17. Thus, the braided wire, which is a mass-produced product, can be used as the heat conductor 17 and cost for configuring the heat conductor 17 can be reduced. However, not only the braided wire, but also various other types of members such as metallic bar bodies can also be, for example, used as the heat conductor 17.

(Second Embodiment)

A second embodiment is described below. It should be noted that, in each of the following embodiments, constituent parts similar to those of the previous embodiment are denoted by the same reference signs and not described in detail.

Figure 2A:
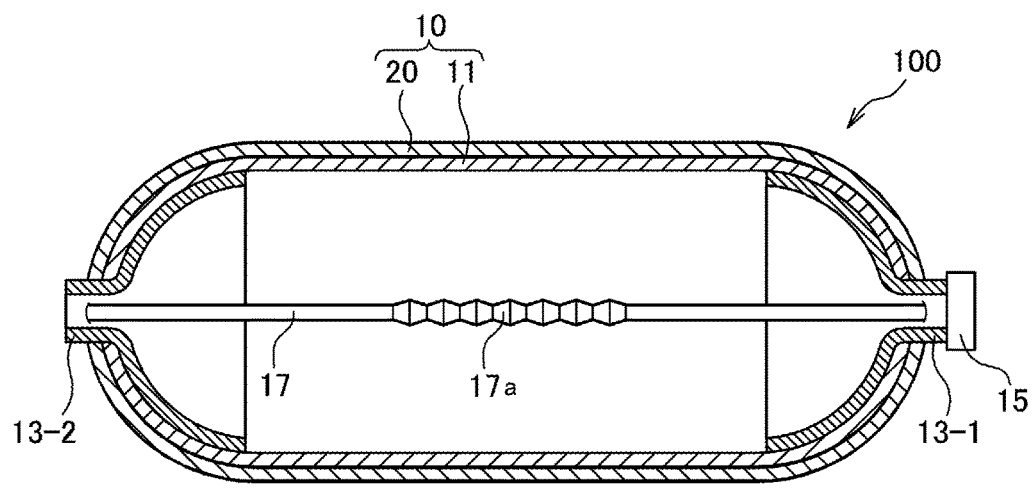
FIG. 2A is a schematic configuration diagram of a high pressure gas container according to a second embodiment of the present invention.
Figure 2B:
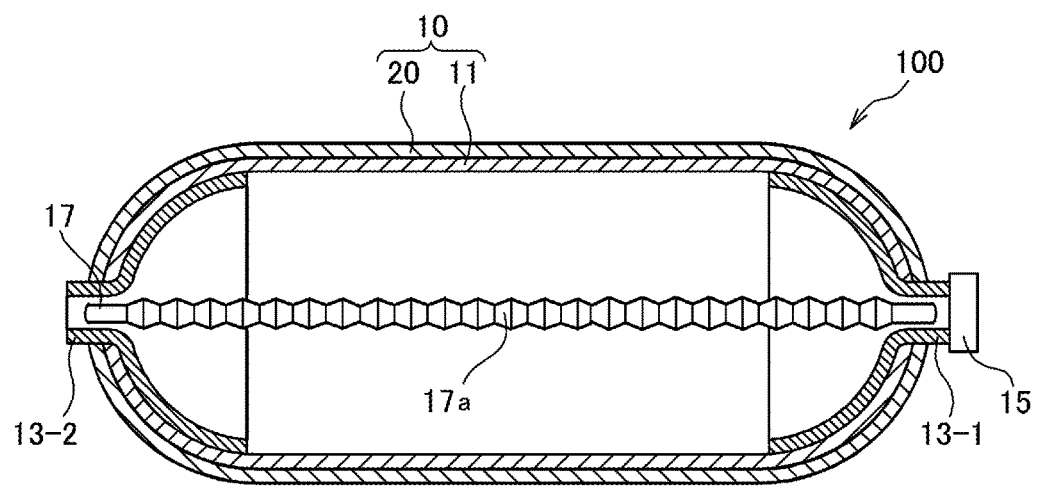
FIG. 2B is a schematic configuration diagram of a high pressure gas container according to the second embodiment of the present invention.

FIGS. 2A and 2B are schematic configuration diagrams of high pressure gas containers 100 in the second embodiment of the present invention.

As shown in FIG. 2A, in the present embodiment, boss portions 13-1, 13-2 on both ends are connected by a heat conductor 17 configured as a bar-shaped shaft made of metal. Further, a bellows portion 17a made of metal and serving as a displacement absorbing portion is configured in a substantially central part in an axial direction of this heat conductor 17. Therefore, when the container 100 undergoes deformation such as expansion, the bellows portion 17a can absorb a displacement due to the deformation. It can thus be suppressed that a load concentrates on specific positions of the boss portion 13-1 (fusible plug valve 15), the boss portion 13-2 and the heat conductor 17 of the container 100 due to thermal deformation or the like.

Further, the bellows portion 17a may also be formed substantially in the entire area in the axial direction of the heat conductor 17 as shown in FIG. 2B. Since the heat conductor 17 thus configured has an expandable structure entirely in the axial direction thereof, an effect of absorbing a displacement in the axial direction is further enhanced and it can be more reliably prevented that a load concentrates on specific positions of the boss portion 13-1 (fusible plug valve 15), the boss portion 13-2 and the heat conductor 17 due to thermal deformation or the like.

According to the high pressure gas container 100 relating to the present embodiment and including the heat conductor 17 described above, the following effects can be obtained.

In the high pressure gas container 100 according to the present embodiment, the heat conductor 17 includes the bellows portion 17a serving as the displacement absorbing portion capable of absorbing a relative displacement occurring between the fusible plug valve 15 and the boss portion 13-2. Particularly, the bellows portion 17a may be partially formed such as in the substantially central part in the axial direction of the heat conductor 17 as shown in FIG. 2A or may be configured over the entire area in the axial direction of the heat conductor 17 as shown in FIG. 2B.

According to this, even if a displacement occurs between the boss portion 13-2 and the fusible plug valve 15 due to deformation such as thermal expansion or contraction, this displacement can be absorbed by the bellows portion 17a. Thus, the concentration of a load on specific positions of the boss portion 13-2, the fusible plug valve 15 and the heat conductor 17 is suppressed, with the result that the breakage of the heat conductor 17 can be prevented.

Particularly, when the bellows portion 17a is partially formed in the heat conductor 17 as shown in FIG. 2A, a manufacturing process can be simplified by relatively reducing the amount of processing for forming the bellows portion 17a.

On the other hand, when the bellows portion 17a is formed over the substantially entire area in the axial direction of the heat conductor 17 as shown in FIG. 2B, even if a displacement occurs at an arbitrary position in the axial direction of the heat conductor 17, this displacement can be reliably absorbed. Thus, the concentration of a load on specific positions of the boss portion 13-1 (fusible plug valve 15), the boss portion 13-2 and the heat conductor 17 is suppressed, wherefore an effect of preventing the breakage of the heat conductor 17 is more effectively exhibited.

It should be noted that, in the present embodiment, a length of the heat conductor 17 is preferably substantially equal to a length between the boss portion 13-2 and the fusible plug valve 15. Since this prevents an extra length while ensuring a displacement absorbing function by the bellows portion 17a, unintended heat transfer from the heat conductor 17 to an inner layer body 11 and the like can be prevented by more reliably preventing the contact of the heat conductor 17 with the inner peripheral surface of the inner layer body 11 and the inner peripheral surfaces of the boss portions 13-1, 13-2.

It should be noted that a mode of the displacement absorbing portion of the heat conductor 17 is not limited to the bellows portion 17a in the present embodiment. For example, the displacement absorbing portion may be configured such as by forming a part or the entirety of the heat conductor 17 in the axial direction of a material having a certain flexibility.

(Third Embodiment)

A third embodiment is described below.

Figure 3:
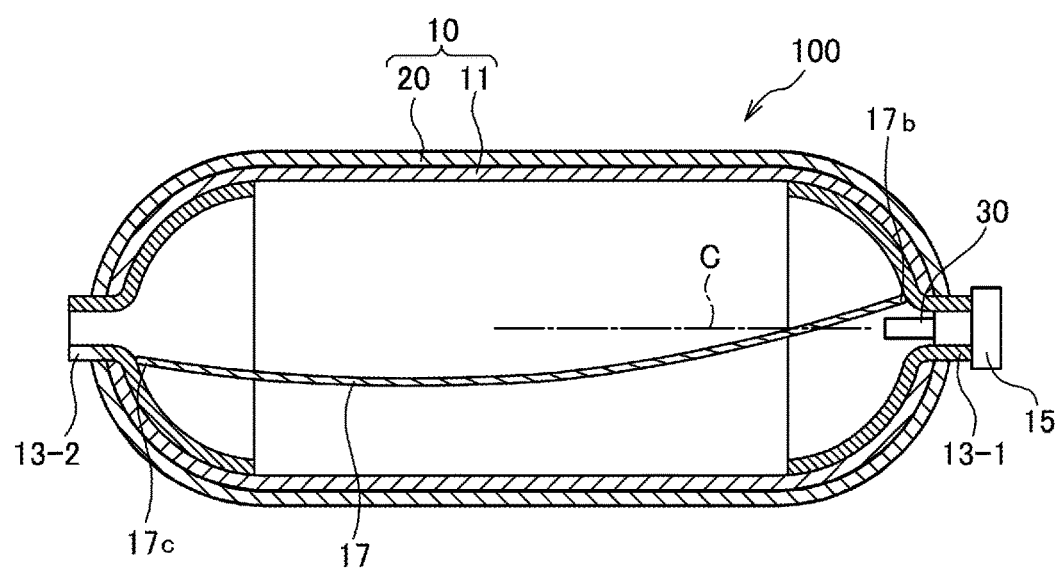
FIG. 3 is a schematic configuration diagram of a high pressure gas container according to a third embodiment of the present invention.

FIG. 3 is a schematic configuration diagram of a high pressure gas container 100 in the third embodiment of the present invention. In the high pressure gas container 100 of FIG. 3, a filling flow passage 30 for filling hydrogen gas is provided in a boss portion 13-1 integrated with a fusible plug valve 15.

The filling flow passage 30 is a flow passage in which the hydrogen gas supplied from an external filling device passes and is operated to open and close by an unillustrated main stop valve. In the present embodiment, a heat conductor 17 is arranged to cross an inwardly extended line C of the filling flow passage 30 inside of an inner layer body 11. Specifically, as clearly shown in FIG. 3, one end 17b of the heat conductor 17 is fixed to an upper part of the inner peripheral surface of the boss portion 13-1 shown in FIG. 3 and another end 17c of the heat conductor 17 is fixed to a lower part of the inner peripheral surface of the boss portion 13-2 shown in FIG. 3.

By the above configuration, in the high pressure gas container 100 of the present embodiment, the flow of the hydrogen gas injected into the inner layer body 11 through the filling flow passage 30 interferes with the heat conductor 17 to be disturbed during the filling of the hydrogen gas. Thus, the diffusion of the hydrogen gas released into the inside of the inner layer body 11 is promoted.

Accordingly, even if a temperature change of the hydrogen gas occurs due to Joule-Thomson effect when the hydrogen gas is filled, this hydrogen gas changed in temperature acts to be uniformized in the high pressure gas container 100. Thus, the uniformity of a temperature distribution in the high pressure gas container 100 is maintained. Specifically, it is possible to prevent an event in which the temperature distribution in the high pressure gas container 100 is disturbed by the above Joule-Thomson effect when the hydrogen gas is filled into the high pressure gas container 100.

Particularly, in the case of the hydrogen gas, an inversion temperature in the Joule-Thomson effect is about 201 K, which is relatively low, and the temperature of the hydrogen gas during filling is higher than the inversion temperature. Thus, the temperature of the hydrogen gas increases during filling. Therefore, the inside of the high pressure gas container 100 may locally reach a high temperature and the durability of the high pressure gas container 100 may be reduced.

In contrast, since the hydrogen gas is diffused while interfering (colliding) with the heat conductor 17 during filling in the high pressure gas container 100 of the present embodiment, the hydrogen gas increased in temperature during filling is diffused and distributed in a container body 10. Thus, the temperature distribution in the high pressure gas container 100 can be promptly made uniform.

In this way, it can be suppressed that the high pressure gas container 100 is exposed to a high temperature and the durability thereof is reduced and, in the case of providing temperature measurement means such as a temperature sensor inside the high pressure gas container 100, a more precise temperature measurement can be conducted. It should be noted that it is particularly preferable in the present embodiment to form the heat conductor 17 of a heat resistant material so that the heat conductor 17 can withstand even if being exposed to the hydrogen gas flowing in from the filling flow passage 30 and increased in temperature.

(Fourth Embodiment)

A fourth embodiment is described below. It should be noted that, in the present embodiment, a high pressure gas container manufacturing method is described, assuming a case where the high pressure gas container 100 of the type described in the above third embodiment is manufactured.

Figure 4:
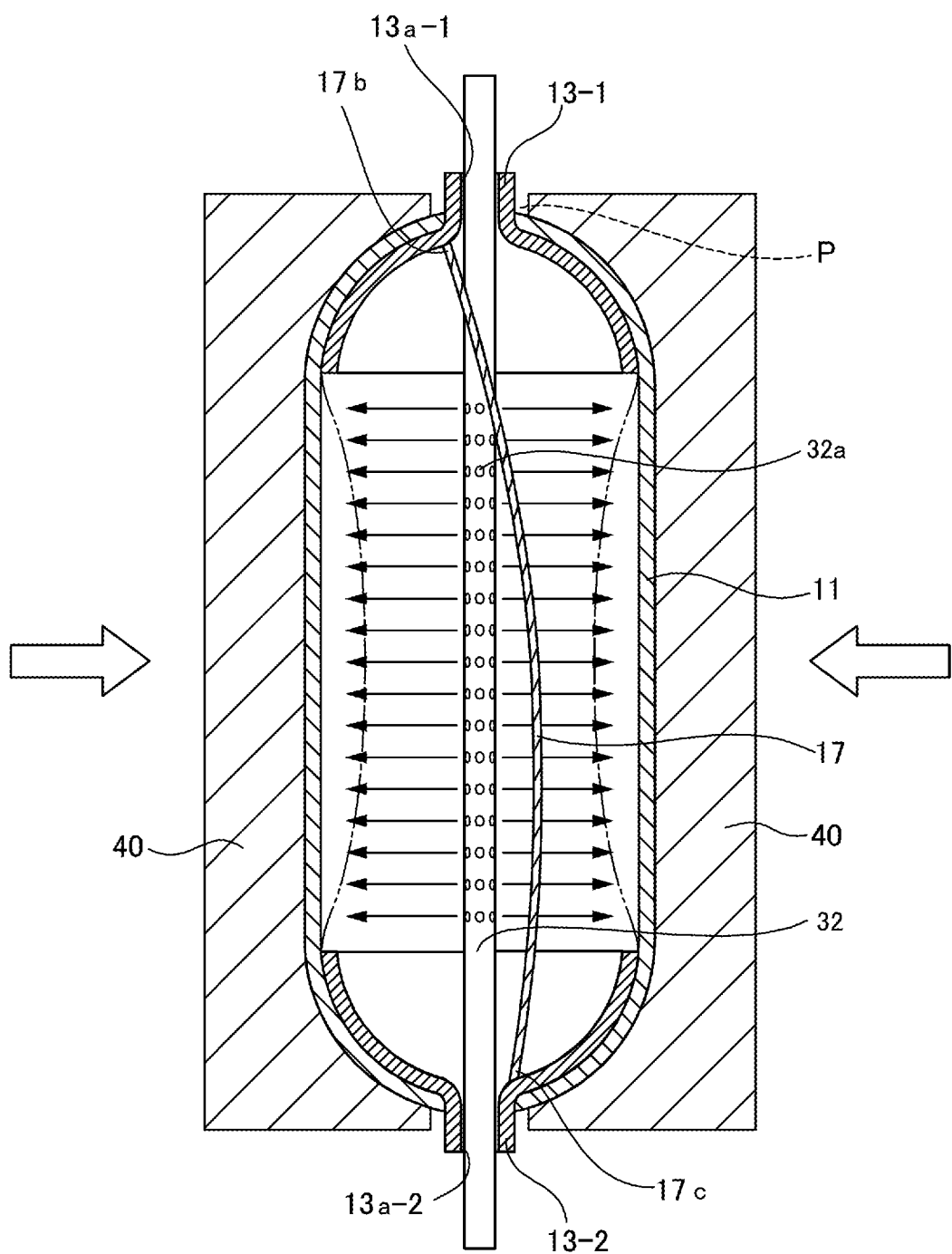
FIG. 4 is a diagram showing a method for manufacturing a high pressure gas container according to a fourth embodiment of the present invention.

FIG. 4 is a diagram showing the method for manufacturing the high pressure gas container 100 according to the present embodiment. In the manufacturing method of the present embodiment, the boss portions 13-1, 13-2 are set in molds 40 and blow molding is performed with the one end 17b of the heat conductor 17 attached to the one boss portion 13-1 and the other end 17c of the heat conductor 17 attached to the other boss portion 13-2.

Specifically, the one end 17b of the heat conductor 17 is first attached to the inner peripheral surface of the one boss portion 13-1 and the other end 17c of this heat conductor 17 is attached to the inner peripheral surface of the other boss portion 13-2 (heat conductor attaching step).

Here, as is clear from FIG. 4, a molding operation is easy since the long heat conductor 17 and the both boss portions 13-1, 13-2 can be treated as an integral member with the heat conductor 17 attached to the both boss portions 13-1, 13-2.

It should be noted that, although not shown, bolt holes for attaching the heat conductor 17 are formed in the boss portions 13-1, 13-2 and doughnut-shaped metal terminals of the heat conductor 17 are fixed by being fastened to these bolt holes, for example, as described in the first embodiment in respectively attaching the one and the other ends 17b, 17c of the heat conductor 17 to the boss portions 13-1, 13-2.

Subsequently, the boss portions 13-1, 13-2 connected to the heat conductor 17 are set in the molds 40 (mold setting step). More specifically, the boss portions 13-1, 13-2 are sandwiched by the molds 40, 40 from both side surface sides of the boss portions 13-1, 13-2.

It should be noted that the heat conductor attaching step may be performed after the above mold setting step, but the heat conductor 17 is most preferably attached before the molds 40, 40 are set since the heat conductor 17 is more easily attached if the molds 40, 40 are not set yet.

Subsequently, a blow pipe 32 formed with a plurality of blow-out ports 32a is disposed to pass through both a hole portion 13a-1 of the one boss portion 13-1 and a hole portion 13a-2 of the other boss portion 13-2 (blow pipe disposing step).

This blow pipe 32 is formed to have such a length as to extend between the hole portions 13a-1, 13a-2 of the boss portions 13-1, 13-2 set in the molds 40, 40. It should be noted that the blow pipe 32 is preferably fixed to the boss portions 13-1, 13-2 such as by being temporarily fastened to the hole portion 13a-1 of the boss portion 13-1 and the hole portion 13a-2 of the boss portion 13-2.

Further, the blow pipe 32 is configured to have a hollow inside and the plurality of blow-out ports 32a are formed along the entire area of a side surface in a longitudinal direction so that air supplied to the inside from unillustrated air blowing means can be released from the side surface. It should be noted that the sequence of the mold setting step and the blow pipe disposing step may be exchanged.

Then, a resin material is introduced into a molding space P formed by the set molds 40 (resin material introducing step). The resin material introduced in the present embodiment is a material such as polyethylene resin or polypropylene resin for constituting the inner layer body 11.

Furthermore, air is blown to the introduced resin material from the inside of this resin through the blow-out ports 32a of the blow pipe 32, thereby molding the inner layer body 11 with the boss portions 13-1, 13-2 (container body molding step). Specifically, air is injected from the plurality of blow-out ports 32a to the resin material before expansion (shown by chain double-dashed line in FIG. 4) to expand the resin material, whereby the hollow inner layer body 11 is formed.

Subsequently, the blow pipe 32 is removed from the inner layer body 11 with the boss portions 13-1, 13-2 (blow pipe removing step). Further, the molds 40, 40 are parted to recover the molded inner layer body 11 with the boss portions 13-1, 13-2 (inner layer body recovering step). It should be noted that the sequence of the blow pipe removing step and the inner layer body recovering step may be exchanged.

Thereafter, a strip-like member made of carbon fiber reinforced plastic is wound around the outer periphery of the recovered inner layer body 11 with the boss portions 13-1, 13-2 (reinforcing layer forming step). In this way, the container body 10 with the boss portions 13-1, 13-2 is obtained. By providing the boss portion 13-1 with the fusible plug valve 15 such as by welding, the high pressure gas container 100 is obtained. It should be noted that the hole portion 13a-2 of the boss portion 13-2 is, thereafter, appropriately closed.

According to the method for manufacturing the high pressure gas container 100 described above, the following effects can be obtained.

In the present embodiment, the high pressure gas container 100 is manufactured which includes the container body 10 formed with the boss portions 13-1, 13-2 respectively on both end parts and in which the boss portions 13-1, 13-2 are connected by the heat conductor 17 inside the container body 10. Particularly, these boss portions 13-1, 13-2 are set in the molds 40, 40 and blow molding is performed with the one end 17b of the heat conductor 17 attached to the one boss portion 13-1 and the other end 17c of the heat conductor 17 attached to the other boss portion 13-2.

In this way, the high pressure gas container 100 accommodating the heat conductor 17 inside can be easily manufactured with low-cost.

It should be noted that, in the manufacturing method according to the present embodiment, the fusible plug valve 15 is provided at the boss portion 13-1 after the container body 10 with the boss portions 13-1, 13-2 is obtained. However, instead of this, the high pressure gas container 100 may be obtained by performing from the heat conductor attaching step to the reinforcing layer applying step described above, using the boss portion 13-1 integrated with the fusible plug valve 15 in advance. In this way, an operation of providing the boss portion 13-1 with the fusible plug valve 15 such as by welding after the reinforcing layer applying step can be omitted. In this case, since the side of the boss portion 13-1 is closed by the fusible plug valve 15 in the blow pipe disposing step, the blow pipe 32 needs to be inserted through the hole portion 13a-2 of the boss portion 13-2. Thus, in this case, the hole portion 13a-2 of the boss portion 13-2 is closed after the blow pipe disposing step is performed.

Although the first to fourth embodiments of the present invention have been described above, each of the above embodiments are merely an illustration of some application examples of the present invention and not intended to limit the technical scope of the present invention to the specific configurations of the above embodiments.

For example, in the high pressure gas containers 100 of these embodiments, the shape, the number, the material and the like of each constituent member can be appropriately changed without departing from the gist of the present invention.

Specifically, the heat conductor 17 of the present invention may be configured as an integrally configured shaft instead of being configured by braiding a plurality of wires or including the bellows portion as described above. Also in this case, heat can be transferred to the fusible plug valve 15 via the heat conductor 17 and a structure inside the high pressure gas container 100 can be simplified.

Particularly, in the case of the integrally configured shaft, the heat conductor 17 has properties close to those of an ideal rigid body. Thus, in the case of manufacturing the high pressure gas container 100 by the manufacturing method described in the above fourth embodiment, the both boss portions 13-1, 13-2 and the heat conductor 17 can be treated as one rigid body with the heat conductor 17 attached to the both boss portions 13-1, 13-2, and the molds 40 can be easily set for these boss portions 13-1, 13-2.

Further, the heat conductor 17 can have any of various shapes such as a chain shape and a plate-like shape provided that the heat conductor 17 is shaped to be able to connect the boss portions on the both ends. Particularly, the heat conductor 17 may be made of an elastic material to be expandable in itself.

On the other hand, the heat conductor 17 may be disposed along an inner wall of the inner layer body 11 in the container body 10. In this case, the heat conductor 17 is preferably fixed to this inner wall. This can reliably prevent a situation where the heat conductor 17 swings to collide with the inner wall of the inner layer body 11, for example, even if the high pressure gas container 100 is installed in a vehicle and the inside of the container body 10 swings due to vibration or the like during travel.

Furthermore, although an example of the high pressure gas container 100 with the boss portions 13-1, 13-2 on the both ends of the substantially cylindrical container body 10 has been illustrated in each of the above first to fourth embodiments, the shape of the high pressure gas container 100 is, of course, not limited to that and can have any of various shapes.

Further, the number of the fusible plug valve 15 to be attached to the high pressure gas container 100 is not limited to one. For example, it is also possible to increase the number of the fusible plug valves 15 and, accordingly, increase the numbers of the heat conductors 17 and the boss portions 13-1, 13-2 in accordance with the size of the container 100, and equivalent functions and effects are exhibited. Further, the arranged positions of the boss portions on the container 100 and the attached position of the fusible plug valve 15 can also be appropriately changed.

Further, the fusible plug valve 15 is not limited to the above one in which a gas release flow passage of the housing is closed by the fusible plug, and various types of fusible plug valves can be used. For example, a fusible plug valve may include a member configured to be moved by a spring or the like when a fusible plug melts, and be structured to indirectly open the gas release flow passage by a movement of that member. Specifically, fusible plugs of various other forms can be employed if gas in the high pressure gas container 100 is allowed to escape in response to exposure to a high temperature.

Furthermore, the manufacturing method of the high pressure gas container 100 is also not limited to the method described in the above fourth embodiment. For example, various other manufacturing methods can be selected according to selection results on materials used for the container body 10, the boss portions 13-1, 13-2 and the fusible plug valve 15, the attached position and the number of the fusible plug valve 15 and the like.

The invention claimed is:

1. A high pressure gas container with a container body having a plurality of layers, and a fusible plug valve and a boss portion arranged at a position different from the fusible plug valve, wherein:
   each of the fusible plug valve and the boss portion has a higher heat transfer rate than an outermost layer of the plurality of layers of the container body; and
   the fusible plug valve and the boss portion are connected by a heat conductor, the heat conductor having a higher heat transfer rate than the outermost layer of the plurality of layers of the container body and being accommodated in the container body such that the heat conductor forms a heat transfer passage through a space inside of the container body,
   wherein the container body has, inside the container body, a gas filling space structured to be filled with high pressure gas,
   wherein the container body is structured to house the heat conductor within the gas filling space, and receive, in the gas filling space, gas that flows into the gas filling space in an axial direction of the container through the boss portion,
   wherein the heat conductor includes a displacement absorber configured to absorb relative displacement that occurs between the fusible plug valve and the boss portion, and
   wherein the displacement absorber is formed by a plurality of wires in a state slackened between the fusible plug valve and the boss portion.

2. The high pressure gas container according to claim 1, wherein:
   a filling flow passage for filling high pressure gas into the container body is provided in a part of the fusible plug valve in the container body; and
   the heat conductor is connected to intersect with an inwardly extended line of the filling flow passage inside of the container body.

3. A method for manufacturing the high pressure gas container according to claim 1, wherein the boss portion is one boss portion of a pair of boss portions, the pair of boss portions respectively provided on both ends of the container body, the method comprising the steps of:
   setting the pair of boss portions in a mold with one end of the heat conductor attached to the one of the pair of boss portions and the other end of the heat conductor attached to the other of the pair of boss portions; and
   molding an inner layer body of the plurality of layers of the container body by performing blow molding in the mold.

4. The high pressure gas container of claim 1, wherein the heat conductor is formed of braided wire.

* * * * *